P • S = Check (no error) = $\overline{P} \cdot \overline{S}$ $\overline{P} \cdot S$ = Error = $P \cdot \overline{S}$

Fig 3

Jan. 13, 1970 D. W. BERNARD ET AL 3,490,010
VERIFICATION SYSTEM
Filed June 24, 1966 3 Sheets-Sheet 3

INVENTORS
RONALD F SCHWAB
DAVID W. BERNARD
BY John J. McCormack
ATTORNEY

United States Patent Office 3,490,010
Patented Jan. 13, 1970

3,490,010
VERIFICATION SYSTEM
David W. Bernard, Sherborn, and Ronald F. Schwab, Watertown, Mass., assignors to Honeywell Inc., Minneapolis, Minn., a corporation of Delaware
Filed June 24, 1966, Ser. No. 560,226
Int. Cl. G11b 5/00
U.S. Cl. 340—174          2 Claims

ABSTRACT OF THE DISCLOSURE

A verification system for an actuator. A pair of bistable magnetic cores are linked by opposed output windings and a reset winding. A permanent magnet is mounted on the actuator to be carried therewith to "set" one of the cores only if the actuator responds properly to a command signal. The other core is "set" by electro-magnetic means energized in response to the command signal. Both cores are reset at a predetermined time after the command signal whereupon the output windings identify the existence of like magnetic states in the cores as a verification of proper actuator operation.

---

The present invention relates to improved translation-sensing apparatus and more particularly to an improved system for monitoring a flux-generating member as to prescribed movement thereof in response to an associated command signal and for automatically indicating correspondence between such movements and such signals.

Translation checking apparatus have increased in significance of late, especially in the data processing arts, where they are employed, for instance, to perform "actuate-translation" checking functions for actuators associated with high-speed printers, punches and the like. For instance, in operating high-speed impact type printers associated with computers, computer "print commands" are characteristically issued to cause associated actuator means to impact a hammer against a record medium in a prescribed, precisely-timed manner. Obviously, the reliability of such an operation should be virtually guaranteed, although, at present, the complex electronics and myriad mechanical parts commonly induce actuation errors. In fact, while the computer art is presently demanding ever-increasing accuracy of such hammer actuation, to assure that printing is performed in the correct manner, at the proper time, etc., it is also imposing countervailing requirements, such as for higher speed, greater machine complexity, lower cost, etc. that work at cross-purposes with increased accuracy. The present invention has been devised to meet this problem with a simplified, yet reliable, actuation sensing and verification means, adapted to be implemented with solid-state logic components.

When computer instrumentalities are commanded to operate, e.g. when a hammer assembly is ordered to impact paper forms by a "print command," it is possible to perform a number of different checks to verify the execution of this command. In the case of a printer system, the only sure check would be to "machine-read" the printed line and compare the readout with the print orders; a feat quite difficult and impractical at present. A more practical technique is to check on whether particular hammers contacted the form with sufficient energy to print, etc.; or, short of that, to verify whether the proper "hammer-actuate" signals issued in response to particular print orders. Of course, this assumes that the hammers concerned are physically present and in good operating condition, i.e. with no broken linkage, with proper electrical connections for energization, etc. A related check technique is to verify whether the proper hammer actuating assemblies were translated properly. The present invention implements this last check technique and provides the aforementioned advantages in a system for sensing actuator translation with improved solid state means and for automatically comparing this information with the related actuation command using related solid state means, thereby automatically verifying proper responsive actuation.

Other verification systems of this type have been proposed; however, they are distinguishable and inferior to that of the present invention. For instance, it is feasible to sense the translation of an actuator element by providing a low reluctance insert therein and also providing an associated transformer-type sensor, the inductive flux-coupling path through this sensor being completed by presentation of the insert adjacent one end thereof. Another proposed system involves the use of a flux-coupling core as a transformer type sensor element to detect the passage of a permanent magnet, the adjacency the magnet applying flux through the core so as to interfere with the coupling therethrough of a continuous carrier driving signal to a secondary output means. Thus, a drop in the output signal from the output means indicates passage of the magnet and proper actuation. These systems have certain drawbacks in comparison with the present invention. For instance, systems according to the present invention require no constant driving signal; provide automatic "actuation-sense" memory thoughout the actuate cycle; have the capability of automatic readout and automatic logical comparison; may be read-out-initiated by a reset signal alone; and only require, in essence, a pair of ferrite cores properly coupled.

Systems according to the invention employ solid state, bistable, flux-switchable memory elements, such as ferrite cores, adapted to be "set" to a prescribed magnetic state by the propinquity of a permanent magnet, or like flux-generating means, carried by moving actuator means. This magnetic state may be interrogated simply by application of the usual reset pulse. Such memory elements can record the passage of a magnetic field until so reset and have the advantage of being sensitive to the amplitude of the passing flux rather than rate of change thereof; also "remembering" this for sampling at a later time, if desired. Such verification is also independent of either "command time" or "execute time," allowing checking to be asynchronous thereof, e.g. at a prescribed machine reset cycle time.

More particularly, the invention provides also an extremely simple verification system for comparing the issuance of an "actuate command" against the execution thereof. More particularly, according to one embodiment, the invention contemplates the employment of a first ferrite toroidal core as a bistable magnetic switch element for storing selection signals and a second such switch element disposed to be "switched" by actuator translation. These two cores are read out conjunctively and are so connected that the readout signals therefrom are "self-comparing" to thereby automatically indicate "Error" or "No-Error." For instance, the sensed outputs may be read out so as to cancel one another in case of a "No-Error" condition. Workers in the art will recognize that by so incorporating these sensing memory and comparison functions in such a simple solid state, two-core system, the invention provides a verification arrangement that is considerably improved (e.g. simpler) than what has gone before. For instance, prior art arrangements have required that analogous sensing and storage devices be continuously impressed with an AC carrier signal. This is not required with the invention; rather a switching signal of relatively low intensity is used and moreover the devices are not subjected to switching currents when the flux from the magnet is operative. Also, prior art systems characteristically require additional logic circuitry and associated driving means to store and compare check signals indicating occurrence of a "command" and an associated "execution." With the invention, such are unnecessary.

More particularly, check systems according to the invention are unique in that they contemplate a "static" kind of core switching and discrete pulse kind of core interrogation. By contrast, prior art systems use dynamic, continuous (carrier-wave) pulses for switching and interrogating. The readout mode of the invention is advantageous and unique, involving the sensing of discrete "switched-core" output pulses reflecting "set" core states, as opposed to prior art detection of the modulation of a continuous output wave as caused by the modified transformer coupling effected in a core by an adjacent field. A feature of the invention is that a "command-sensing" select core may be provided and may be readout-wound in common with an "actuate-translation-detecting" actuate core. That is, a single interrogation (reset) pulse common to both cores, can produce a combinatorial, error-indicating output signal through a common output winding, this signal occurring when the cores are in different magnetic states. Thus, when the invention takes the form of an automatic punch vertification system, it can eliminate special compare logic, storage logic, separate readout and reset means and the like. In certain cases the invention even permits setting of the "select core" with the actuator signals themselves, such as by a "kick-back pulse" from an interposer-selecting solenoid, eliminating the usual special core-setting drive means and related means coupling it to "punch command" signal means. The invention can also eliminate commonly required select-signal storage means (e.g. often a complicated flip-flop memory stage) as well as eliminating carrier signal generation means and related modulation detect means, and the like.

As an example of its advantages, the present invention, when used for punch-check purposes, has been found capable of eliminating 8 to 14 printed circuit packages— a substantial saving. By combining the logical comparison and actuation sensing means, the invention simplifies them, e.g. so they may comprise a single small circuit package on a punch head assembly, facilitating such significant advantages as: reduced wiring and associated impedance losses, reduction of CPU interface problems, usage of printed wiring, etc. In short, the invention can provide a punch-check arrangement using merely two ferrite cores per actuator plus coupling circuitry where much more was required before. Consequently, all punch checking can be done by means within the peripheral punch unit itself, independent of any special adaption of a Central Processor. The resultant punch-check will be highly accurate as well, detecting both erroneous punching, i.e. punching where it is not requested, as well as punch-failure, i.e. no punch when one was requested.

Thus, it is an object of the present invention to provide a solution to the above and related problems and provide the above and related features and advantages, as well as others apparent to those skilled in the art.

Another object is to provide a simplified, solid state actuation verification system. Still another object is to provide such a system including a novel translation-monitoring arrangement in combination with a novel self-comparing readout arrangement. Still another object is to provide such arrangements, using solid state memory means.

Still another object is to provide such a system which dispenses with the use of such prior art expedients as AC carrier-signal excitation, special independent storage logic, comparison logic, and the like; instead providing a pair of bistable switchable elements which are read out and reset by a single common pulse means, neither element being required to be continuously switched.

Yet another object is to provide a simple arrangement for indicating occurrence of a command signal, indicating responsive execution movement (or lack thereof), and to be automatically read out so as to indicate agreement therebetween, using substantially only a pair of ferromagnetic switchable elements. A related object is to provide this and also to store such indications for delayed readout.

It is still another object to provide a punching apparatus for use with computer records and including such a verification system operatively associated with each punch member for indicating proper operation thereof in response to punch command signals and for being so read out as to automatically verify execution of these signals.

The above objects and features of advantage are achieved in an exemplary embodiment which comprises a punch verification system for checking prescribed translation of punch members, each member having a magnetic flux-generating magnet mounted thereon so as to be translated adjacent a first ferrite toroidal detect core so as to induce a prescribed "quasi-set" condition therein and thereby indicate proper punching movement by the associated member; each detect core having a second toroidal select core associated therewith and arranged to be switched into a prescribed "set" condition by associated punch command signals; common reset means being also provided to so reset associated pairs of said select and detect cores to a prescribed "reset" condition at prescribed times being connected therewith so as to thereby also induce readout signals therefrom conjunctively; these readout signals being coupled from said cores in common to indicate like or unlike conditions thereof; and automatic comparing means also being arranged with said reset means so as to verify execution of said associated command signals.

Further objects and features of advantage of the present invention may become apparent upon consideration of the following detailed description of certain embodiments thereof, especially when taken in conjunction with the accompanying drawings, where like reference numerals denote like parts, and wherein.

IN GENERAL

Figure 1:
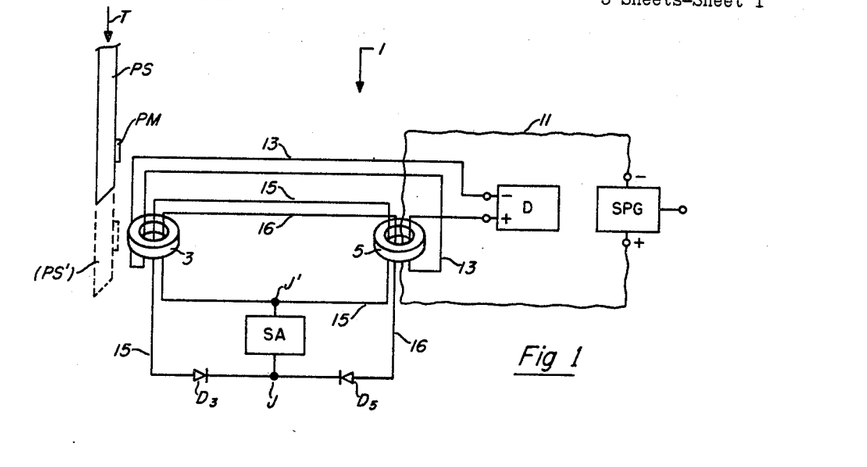
FIGURE 1 is a schematic representation of one exemplary punch unit (of several) in a computer punch apparatus, and, in block diagram form, an associated electronic verification arrangement for punch checking according to the present invention.

Referring now to FIGURE 1 of the drawings, the overall operation of the preferred embodiment will first be briefly summarized and then described in detail. This embodiment comprises a punch check type of "actuate-verification" system 1, arranged to monitor the actuating mode of an associated punch shaft PS, the actuated element, responsive to associated "punch signals." One such system will be provided for each such punch shaft in a typical card punch apparatus, as known in the art. Verification system 1 employs a pair of toroidal ferrite switching cores 3, 5 as magnetic flux-sensitive bistable switching elements. Core 5 is arranged to indicate the occurrence of "punch signals"; while associated detect core 3 is adapted to check on whether the proper responsive movement was executed by associated actuator (punch) element PS. To this end, punch shaft PS carries a flux-generating means, namely a permanent magnet PM, arranged to be moved into prescribed magnetic relation with detect core 3 during proper execution. A pair of verification cores arranged like cores 3, 5 will be understood as provided for each of the several (e.g. 12) punch shafts normally found in a punch apparatus so as to monitor the proper operation thereof, i.e. proper punch motion and interposer coil operation plus agreement thereof with an associated punch command signal. As a second function, cores 3, 5 are so interconnected and energized as to automatically perform logical operations for verification of proper punch execution by their associated punch unit. These functions are detailed below.

Figure 4:
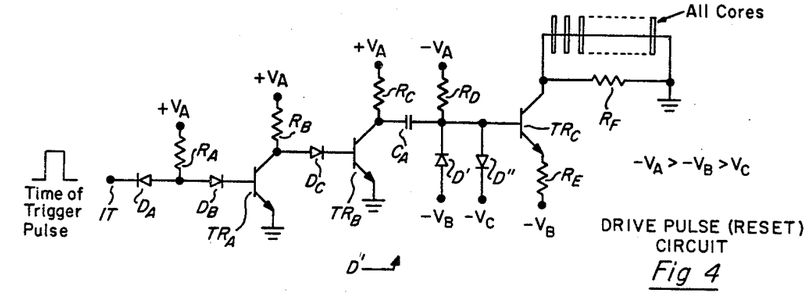
FIGURE 4 shows an electrical schematic of a representative reset driver circuit for employment with the verification system of FIGURE 1.

To summarize the checking operation, when a punch signal is applied to a particular (selected) punch interposer (not shown but well-known in the art) and the associated punch shaft (PS) is responsively coupled to the common drive means (not shown) to be thrust thereby downwardly so as to perforate a passing computer record (not shown) the following events will occur. A "select" pulse reflecting occurrence of this punch signal, will be applied to select core 5 switching it to a prescribed "set" magnetic state (e.g. binary "zero"). As magnet PM is carried by punch PS to come closely adjacent detect core 3, it will quasi-switch or half-switch the latter (as explained below) to a prsecribed (e.g. binary "one-half") magnetic state. Before the next punch cycle, a "Reset" pulse will be generated by a reset driver stage D, adapted to switch cores 3, 5 conjunctively to a prescribed "reset" (e.g. binary "one") magnetic state. A suitable driver circuit is shown in FIGURE 4 and described below. Driver stage D is coupled in common to cores 3, 5 in a prescribed manner, having a reset winding 13 and a pair of readout windings 15, 16 threaded through both of the cores in a prescribed manner for "opposing readout" therefrom, as explained below.

Thus, it is a feature of the invention that a combination "reset/readout" means D is so coupled with cores 3, 5 that if both cores have been switched to similar magnetic states (e.g. to "zero" and "one-half" as above) the output voltages induced therefrom will be opposing. These outputs may also be made equal by conventional means so as to cancel to produce a resultant "null" at the output sensing means when so reset from like states, i.e. both "reset switched." The indicated output sensing means comprises an output sense amplifier SA which is adapted to indicate a "null" output to represent a normal, proper "no-error" operation by the associated punch (magnet thereof); that is, "punching" translation when such is commanded; otherwise none such. However, if only one of cores 3, 5 has been switched (i.e. to the set or one-half states) then the Reset pulse will induce only one readout pulse to be applied to SA, with no opposed cancelling pulse, the cores in this case not having both been switched out of the "reset" magnetic state. Thus, amplifier SA would indicate a "non-null" indicating an error condition. It is a feature of the invention that no additional logic circuitry is required for the above storage and comparison functions, this being automatically performed (self-comparing) by the structure of cores 3, 5 and their coupling to one another and to Reset and Readout means.

IN DETAIL

Referring now in more detail to the structure of verification system 1, it will be understood that a punch shaft PS is selectably reciprocable in direction T, as indicated by arrow, when the punch command signal activates associated thrust-applying means, i.e. the interposer and associated solenoid, etc. as known in the art. It is assumed that each punch shaft in the punch-apparatus will be so actuated upon the occurrence of its own respective command signal and that its response thereto may be monitored according to the invention by an associated verification system like system 1. Actuated shaft PS is adapted to move to a prescribed extreme actuated position, indicated in phantom at PS' in FIGURE 1 and to carry an associated permanent magnet PM disposed thereon so as to come operatively adjacent detect core 3 so as to direct a prescribed magnetic flux thereat sufficient to "quasi-switch" the core. Thus, detect core 3 is disposed operatively adjacent the extreme actuation path of associated permanent magnet PM. The phenomenom whereby magnet PM "quasi-switches" core, i.e. switches it out of its "reset state," is more completely discussed relative to FIGURE 4 below. The electrical circuit connecting cores 3, 5 is arranged as follows: Select core 5 is coupled to a source of select pulses, namely select pulse generator SPG by a winding 11, threaded and wrapped around as known in the art. It will be understood that generator SPG supplies a "select" pulse adapted to switch core 5 at times reflecting the occurrence of an actuate command pulse commanding the punch actuation of associated punch shaft PS. For instance, generator SPG may be energized by the onset of the punch command pulse applied to an interposer solenoid, may be energized by a "kickback" pulse from such a solenoid (see FIGURE 5 described below) or the like.

Cores 3 and 5 may comprise toroidal (or annular) reentrant cores (e.g. square-loop ferrite switching or storage type). Cores 3, 5 are coupled by a winding 13 in a prescribed manner to a driver stage D adapted to generate readout/reset pulses for reset switching of the cores at prescribed readout times as indicated above. Cores 3, 5 are both coupled through a pair of positive and negative readout windings 15, 16 to a pair of readout junction points J, J' whereat the summed readout signals therefrom may be detected. Windings 15, 16 proceed oppositely from junction points J and J' to be wrapped successively and opposingly about cores 3, 5, and returned to the other junction point. Amplifier SA is coupled across junction points J, J' and a pair of diodes D3, D5 are provided to couple the outputs from cores 3, 5 to amplifier SA, unidirectionally. Amplifier SA may comprise a null-detecting amplifier known to those skilled in the art, being adapted to indicate the occurrence of like and unlike output pulses from cores 3, 5 at readout times.

Driver means D may comprise a periodic current pulse generator, such as a single-shot multivibrator or the like, known to those skilled in the art, being adapted to apply a constant current pulse along winding 13 adequate to switch cores 3, 5 re-settingly. Such a driver circuit is indicated in the schematic circuit diagram D' in FIGURE 4. This circuit will be understood to be acitvated by a prescribed input timing pulse on input terminal IT at a readout time, being initiated by conventional punch control timing means, to responsively generate the prescribed reset pulse. The driver circuit as shown in FIGURE 4, may conveniently reset all detect and select cores in all of the punch positions jointly, i.e. throughout the punch apparatus. The level of the pulse from driver D and the wrapping of winding 13 around the cores will be understood to assure this resetting action, as is indicated schematically in FIGURE 6. However, it has been found desirable for optimized driving efficiency to use several such driver stages, each one resetting a prescribed set of cores. It is also preferred to connect different drivers to each (detect/select) core in an associated pair, where possible, to thus provide different reset sources, to thereby be able to automatically flag failure of any one driver as an "error condition."

Detect core 3 may comprise a flux-switchable bistable device which, when switchingly responsive to the reset pulse from driver D, will apply a prescribed readout pulse to output amplifier SA, while select core 5 is similarly adapted to provide an equal, but opposite readout pulse under these conditions. Permanent magnet PM will comprise a magnetized insert of ferromagnetic, high remanence material disposed on shaft PS so as to assume a switching, flux-coupled relation with detect core 3, as aforesaid. It will be apparent to those skilled in the art that the equal and opposite readout pulses from cores 3, 5 (applied to amplifier SA) may be effected by selection of the core characteristics, by the wrapping of windings 15, 16 differently about each core, by differential amplification core outputs, or by a combination of these.

Figure 7:
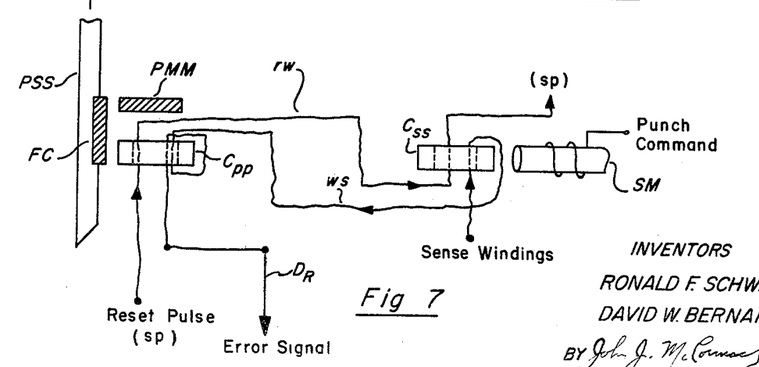
FIGURE 7, after the manner of FIGURE 1, illustrates an alternate, modified embodiment of a verification system.

A different, though related, solid state verification system 1' is indicated in FIGURE 7, being like verification system 1 functionally and relatively the same structurally, except as indicated hereinafter. System 1' includes a pair of punch detect, select cores $C_{pp}$, $C_{ss}$ similar to cores 3, 5 respectively in FIGURE 1. Detect core $C_{pp}$ is arranged to be brought operatively adjacent a magnetic element FC inserted in a reciprocating punch shaft PSS when the latter properly "bottoms," as for system 1 before. However, magnetic insert FC does not comprise a permanent magnet, as before, but rather the permanent magnet flux-generating means is separately provided at PMM, the operative flux of which is to be selectively directed at core $C_{pp}$ by insert FC. In this embodiment, shaft PSS will be seen to comprise a relatively high reluctance type material whereas insert FC comprises a rather low reluctance material forming an efficient flux conduit for selectively directing the magnetic flux generated by magnet PMM to "quasi-switch" detect core $C_{pp}$ during a proper punch bottoming (as indicated in FIGURE 7), but not otherwise. Additionally, magnet PMM may be arranged, if desired, to pre-bias core $C_{pp}$ magnetically making it relatively easier and quicker for it to be "quasi-switched" when insert FC comes operatively adjacent.

The "select" switching means, driving select core $C_{ss}$, is also modified somewhat. For this purpose, a magnetic flux generating means SM, such as a solenoid-wrapped core, is provided, being shown here as functionally comprising an electromagnet. The windings of magnet SM are adapted to be energized at the onset of a punch command so as to apply a "quasi-switching" flux to core $C_{ss}$, similar to that described above as imposed by magnet PM to switch core 3 in system 1. Thereafter SM must be demagnetized so that core $C_{ss}$ may be reset. Thus, both the select and detect cores may be "quasi-switched" by permanent magnet flux. A flux-bias may also be provided for core $C_{ss}$ if desired to facilitate switching thereof. A reset winding $rw$ is provided for conveying a reset pulse SP to reset both cores $C_{pp}$, $C_{ss}$, conjunctively, flipping the magnetic domains thereof (if they had assumed the opposite magnetic state) to induce readout pulses as before. Also, as before, a sense winding means $ws$ is provided, being wrapped around cores $C_{ss}$ and $C_{pp}$ successively and oppositely, the wrapping around the cores being in the opposite sense (direction) so as to induce opposite-polarity readout signals, functionally similar to those presented to sense amplifier SA in FIGURE 1. Output $D_R$ is provided at the readout terminal (of $ws$). It will be recognized that the readout signals from cores $C_{ss}$, $C_{pp}$ are arranged to be opposite and roughly the same magnitude, as before, and the readout arrangement must reflect this. That is, winding $ws$ will present an output error pulse to switch an output diode conductive only in cases where the cores are in an "unlike" magnetic state, that is, no output (a "null") will appear if both cores are left in the "reset" state or both are "quasi-switched" to the "one-half" state. Workers in the art will recognize that other analogous arrangements combining the select core and the translation detecting core may also be provided in accordance with the invention.

A different punch/check arrangement is shown schematically in FIGURE 8, which is functionally like those in FIGURES 1 and 7 and is structurally relatively the same, except as follows. As in the case of FIGURE 1, the actuated punch has a magnet PPM mounted thereon to be brought operatively adjacent a punch core CCP in its actuated position (in phantom). However, in this embodiment, one distinguishing feature is the provision of a magnetic flux shield SH provided to intercept magnetic flux from magnet PPM and prevent it from influencing core CCP except when PPM is very close to CCP. A shielding means like SH can thus accurately define a "check zone" Z in which magnet PPM influences sensing core CCP. For instance, in some cases, such as where the punch has a rather short excursion distance, magnet PPM might, when in its upward unactuated position (as shown, i.e. outside zone Z) might undesirably influence (partially switch, etc.) core CCP. Thus, it is preferred that shield SH be comprised of low reluctance, non-magnetizable material and be disposed to extend sufficiently between PPM and CCP to shield the latter as aforesaid. Such shielding means may likewise be provided to shield core $C_{pp}$ or core 3 in the embodiments of FIGURES 7 and 1, respectively.

Figure 8:
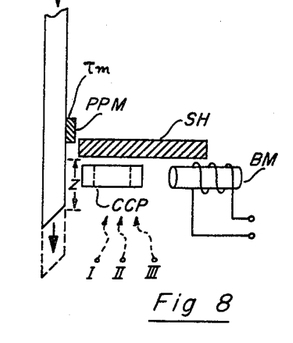
FIGURE 8, after the manner of FIGURE 7, illustrates embodiment slightly modified therefrom.

Another distinguishing feature of the embodiment in FIGURE 8 is the provision of a biasing means such as biasing solenoid BM to supply a prescribed amount of "quiescent" magnetic flux to core CCP so as to condition it to be further "quasi-switched" a prescribed amount by magnet PPM. Such a pre-biasing means may also comprise a permanent magnet or may be made adjustable in strength to compensate for variations from the norm of the magnets and cores.

Figure 9:
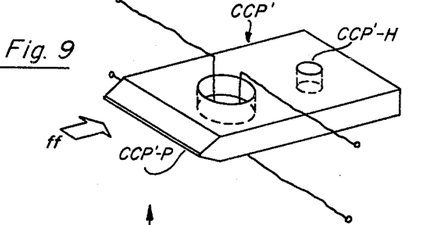
FIGURE 9 is a schematic perspective of an improved core storage device adapted for use in the invention.

A modified version of a punch or actuate-sensing core, such as core CCP, is shown in the form of core CCP' in FIGURE 9. Core CCP' is distinguished including a contoured, flux-confronting portion, or face, CCP'–P. Face CCP'–P has been beveled as indicated to narrow the flux-conducting cross-section thereof which coacts with incident flux, indicated at $ff$. Face CCP'–P is also square shaped so as to conform with the opposing flat of the flux-projecting portion of magnet PPM and thus be flux-coupled closely therewith. It will be apparent to those skilled in the art that modifications of this cross-sectional attenuation and face-profiling may be provided according to the invention to couple such sensing cores to the flux-generating means minimizing the (air gap) reluctance losses therebetween. Such a modification is shown by core CCP'' in FIGURE 12 for instance.

One evident result of such cross-sectional reduction is that the "flux-aperture" of a core is greatly narrowed, thus reducing (sharpening) the zone (cf. Z, FIGURE 8) within which it may be switched and also increasing flux density therethrough, thus providing stronger, sharper, flux-transitions and resultant quasi-switching action. It will be noted that core CCP' has a relatively parallelpiped profile except adjacent pointed face CCP'–P and has a central aperture provided for the sense and other windings, rather than assuming a toroidal core configuration as before. However, core CCP' will be otherwise functionally equivalent to cores 3 or CCP above. Indeed in certain cases, those skilled in the art will recognize that a single piece of bistable magnetic switch material, after the fashion of CCP', may replace both the sense and the select cores, having two, rather than one, internal winding-apertures and, of course, two switching areas.

Core CCP' is additionally provided with an attachment bore, CCP'-H, provided for insertion of a bolt, screw or the like to attach core CCP' to a support (e.g. frame) member. Such an arrangement is provided in lieu of the more typical clamping arrangements, such as where the periphery of a core is clamped down against a rigid member, upsetting the desired magnetic properties thereof.

FIGURE 8 may also be considered in a somewhat different aspect to illustrate a modified technique for quasi-switching a sense core to check translation of magnet PPM; in this case, however, checking the time of translation, as well as the translation position. In this case, the checking and readout will be effected by sense core CCP alone, rather than in conjunction with a second core as before. That is, besides merely indicating the arrival of magnet PPM adjacent a particular "actuate position" (in "check-zone" Z), core CCP may also indicate whether the magnet is there at a prescribed "check-time." An error signal will thus indicate absence of the magnet from this zone at this time and the fact that the magnet traversed the zone before or after this time will be ignored.

More particularly, consider magnet PPM as arranged so that the top edge thereof lies along "check zone" Z at this prescribed "check time" (corresponding roughly to "echo check" time as understood in the art). It will be apparent that "check zone" Z, in which magnet PPM is adapted to influence core CCP, may be established by one or a pair of shielding means SH which are adapted to channel the switching flux from PPM to core CCP only when PPM is in this zone. Shield SH may, of course, be dispensed with, as may solenoid BM in this case.

Core CCP will be understood as provided with three windings indicated as dotted lines and comprising a "set" winding I, a "reset" winding III and an output winding II. It will be understood that magnet PPM is able to inhibit the switching of core CCP by a prescribed set signal along winding I only if it occupies zone Z contemporaneous therewith.

It will further be understood that a prescribed "reset" signal is coupled periodically along reset winding III to reset core CCP into a prescribed reset magnetic condition ("one state"), a prescribed interval following each "check time." The prescribed "set" signal is coupled along set winding I at "check time" to switch core CCP settingly from the aforementioned reset condition to a prescribed set magnetic condition ("zero state"). The timing of such a set signal may, for instance, be gated from occurrence of the "command signal." Thus, the punch command associated with this punch may initiate this set signal after a prescribed delay, corresponding to the time it should take magnet PPM to occupy zone Z, given proper execution, and thus will establish "check-time." At this "check time" an "error readout" along readout winding II is enabled, for instance, being initiated with the set signal as above.

An output on readout winding II at check time thus indicates execution error, being induced when the set signal switches core CCP uninhibited by the presence of magnet PPM (flux therefrom). Conversely, it will be seen that presence of magnet PPM in zone Z at "check-time" will operate to inhibit the setting of core CCP, i.e. to prevent the set signal along winding I from switching core CCP from the "one state" to the "zero state," in which case no "Error" output will appear along winding II. Therefore, should magnet PPM traverse zone Z early, late, or not at all, and thus not be present in Zone Z at the prescribed "check time," the signal on set winding I will switch core CCP to the "zero state," inducing an "Error" output along readout winding II.

This embodiment, therefore, is somewhat unique in providing a single core verification arrangement; also one that verifies translation timing as well as position. Further, this core may be controlled simply by a permanent magnet on an actuator linkage being interrogated with prescribed reset and set signals to indicate time position errors in the execution operation of the actuator, responsive to prescribed command signals. Those skilled in the art will recognize the attractive simplification effected by such an embodiment, without, nonetheless, sacrificing any needed accuracy or reliability. In short, this embodiment, as opposed to preceding ones, adds a time-checking function to the translation-monitoring function of the invention. Such will be particularly advantageous for certain applications where the combined time/translation performance of an actuated member must be checked.

Figure 12:
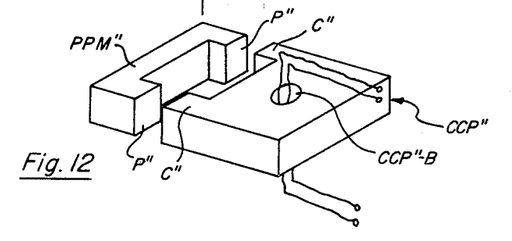
FIGURE 12 is a perspective view of a modified core storage device and associated modified flux-generating device such as are indicated in FIGURES 1–9.

FIGURE 12 shows a further modification of the sensing core, here indicated as CCP'', as well as a modification of the punch magnet, here indicated as PPM''. In this case, magnet PPM'' and core CCP'' may be understood to be operated like the foregoing embodiments (e.g. in FIGURE 8), except as follows. PPM'' is presumed mounted in a moving actuator linkage, like punch PS in FIGURE 1 or its counterpart in FIGURE 8, etc. The cross-sectional shape of magnet PPM'' is particularized to comprise a U-shaped bar having a pair of opposite magnetic pole faces $p''$. The associated core CCP'' includes a pair of coupling legs $c''$, the ends of which confront pole faces $p''$ to efficiently couple with the flux emanating therefrom. These ends are conformed to the cross-sectional dimensions and shape of pole faces $p''$ and are disposed opposite thereto so as to come into an efficient flux-coupling relation therewith during "quasi-switching" time, (e.g. when punch carrying magnet PPM'' "bottoms"). Accordingly, legs $c''$ couple this flux to the switching area of core CCP'', that is, to the magnetic material re-entrantly surrounding winding bore CCP''-B thereof.

It will be recognized by those skilled in the art that this semi-reentrant, U configuration of magnet PPM'' is able to conserve the magnetic quasi-switching flux emanating therefrom, directing it more efficiently to the associated core CCP''. For instance, magnet PPM'' thus provides its own flux-return-path, reducing the wasteful fringing field traversals which otherwise occur. Other configurations of magnet PPM'' and of conformed core CCP'' effecting these results will occur to those skilled in the art.

Another feature associated with modified semi-reentrant magnet PPM'' is that it so directs flux through associated core CCP'' as to have a relatively short return path therein so that "flux turn-around" may occur substantially within the body of the core. As a result the magnetization therein will be relatively asymmetric, aligning domains on one side of winding bore CCP''-B in one magnetic direction preferentially. In some cases, such asymmetric magnetization may be preferred.

Figure 10:
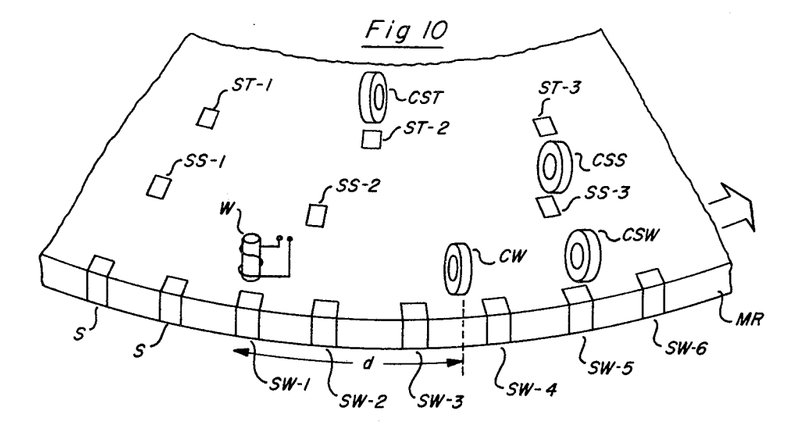
FIGURE 10 is a schematic perspective view of a modified arrangement of core storage devices like those above in a magnetic recording and record controlled sequencing system.
Figure 11:
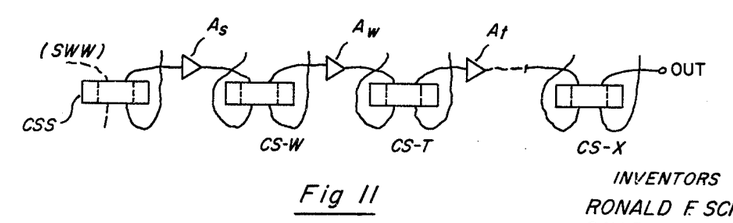
FIGURE 11 is a very schematic circuit diagram of a method for sequentially coupling the core devices in FIGURE 10.

The embodiment indicated in FIGURES 10 and 11 suggests how a plurality of sense cores, such as core 3, core CCP, etc. above, may be employed for different, though analogous, purposes to those described above. In the first instance, FIGURE 10 may be understood to schematically illustrate a portion of a magnetizable record MR, such as a section of magnetic tape, a magnetic disc, or the like, where, in certain prescribed zones S, magnetic indicia, (i.e. spots SW-1, SW-2, SS-1, etc.) may be written. These indicia may be understood as recorded by a conventional magnetic recording head, functionally indicated as a write-head W. As record MR proceeds in the direction of the arrow, it will be understood that write-head W may impress spots (magnetizations) thereon. A "write-check" core CW is provided a prescribed distance "$d$" past the write station defined by head W to check for the presence of these indicia. The windings associated with this and the other cores here are omitted for clarity. More particularly, it will be understood that with proper periodic resetting like that indicated above, core CW may be "quasi-switched" by passage of written spots SW-1, etc. and the switched output therefrom indicating "writing," or not, be used for verification purposes, as with the foregoing embodiments. Thus, for instance, when a signal commands head W to write at a given position, e.g. the locus of SW–4, the execution of this "write command" may be checked by testing the switched state of core CW just after this position (SW–4) has passed thereby, since a magnetization there is intended to "quasi-switch" core CW. This delay time will, of course, correspond to the time for record MR to normally traverse distance "$d$" after "SW–4" was written.

Besides such, "writing-verification" applications, magnetic spots may be used for so quasi-switching cores, singly or in a group, for other purposes. For instance, a plurality of such sensing cores may be disposed and interconnected so as to generate respective signals in a prescribed ordered sequence at times controlled by a magnetized record. Such is indicated by the arrangement of cores CS (i.e. CST, CSS, CSW) relative to record MR, the inter-connections thereof being indicated in FIGURE 11. More particularly, cores CS may provide a "self-sequencing" timing pulse (e.g. strobe pulse) generator arrangement, initiated by magnetizations along separate core-referenced tracks. That is, magnetized spots, such as spots SW, SS, ST may be arranged along respective tracks, each track being monitored by one of cores CSW, CSS, CST with the cores coupled to be enabled sequentially at times indicated by the magnetized record.

Thus, in the coupling arrangement indicated in FIGURE 11, core CSS will be understood to be coupled, through output amplifier stage $A_s$, to enable following core CS–W. That is, with CSS having been reset (and then pre-biased, if desired—e.g. by winding SWW indicated in phantom), the passage of the next associated magnetic strobe mark SS (e.g. spot SS–3 along the CSS track) "quasi-switches" CSS to thereby initiate a readout pulse therefrom. This readout pulse is coupled through amplifier $A_s$ and the indicated couple-winding to "pre-bias" following core CS–W. This pre-bias will be understood as required to "enable" core CS–W so that it may thereafter be "quasi-switched" by the next spot along its associated track (e.g. spot SW–4) and generate an output along the associated couple-winding and amplifier ($A_w$) to pre-bias following core CS–T. In this manner any number of such sequentially coupled cores may apply the "quasi-switching" output thereof to precondition the next-in-line core, (e.g. top re-bias it or alternatively to "reset" it) and enable it, then (but not before), to be "quasi-switched" by passage of the next magnetization along its associated track. In summary, the readout pulse from CS–W is coupled to reset succeeding core CS–T and so on, concluding with the last core in line, indicated as CS–X. The output from last core CS–X may be, in turn, coupled back to reset starting core CS–S, or an independent starting signal may be provided for this, such as along winding SWW.

It will be recognized by those skilled in the art that such a pulse signal generator has an inherent self-sequencing or "internal ordering" provided by the coupling thereof, the activation times thereof being record-controlled. This arrangement eliminates ambiguities often present in conventional signal generators which are unable, of themselves, to provide such without external means. It is, therefore, of significant advantage in this embodiment that the sense cores are sequence-coupled so that the readout pulse from one may be used to reset a succeeding core making independent reset signal means unnecessary. Of course, other separate output windings (not shown) may be understood as being available from each core, e.g. for sequenced control output signals.

OPERATION

Figure 2:
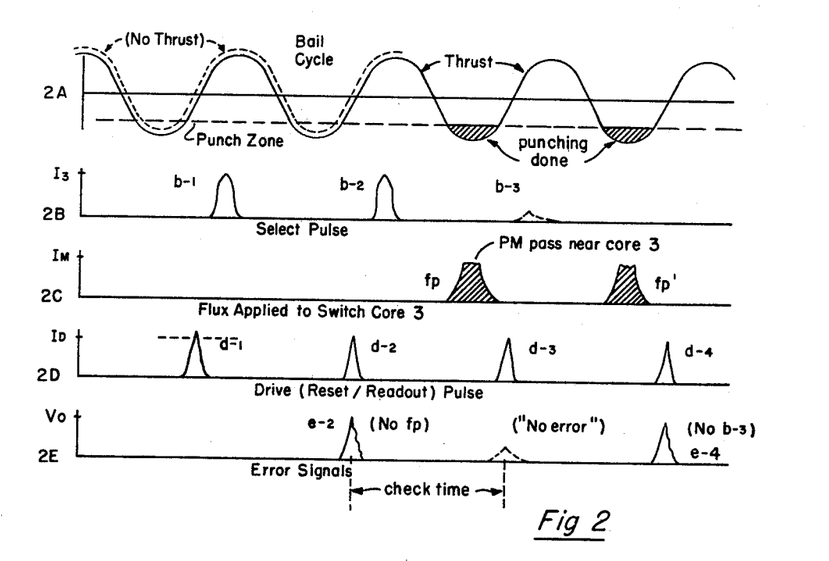
FIGURES 2A–2E comprise a timing diagram of associated elements in FIGURE 1.

The characteristics and operation of the invention will become more apparent with the following description of the operation of the elements of System 1 in FIGURE 1–1, in conjunction with the timing diagram comprising FIGURES 2A–2E. The corresponding elements in the other embodiments will operate similarly. Thus, it will be understood that, as is conventional in the art, an actuator drive means (e.g. a punch bail) is reciprocated continuously as indicated in FIGURE 2A, the downward thrust (arrow T in FIGURE 1) thereof being adapted to perform punching at a prescribed bottoming punch zone thereof, each punch shaft being coupled thereto through appropriate (interposer) linkage means when that shaft is "selected" to punch. For instance, punch signals may cause shaft PS to be coupled to the drive means through a conventional interposer arrangement except during the "No Thrust" times, indicated in 2A by the dotted line. Interposer-select pulses (actuation command signals) may be conventionally applied to cause prescribed "select pulses" ($b$), indicated at FIGURE 2B, of at least prescribed minimum current value to be applied from generator SPG to "set" select core 5, i.e. switch it from the reset state (e.g. from the "one" to the "zero" state). The first such select pulse, $b$–1, reflects the fact that the interposer has been commanded to assume an "on" position, coupling punch shaft PS to the oscillating drive bail to thereby translate PS during its punch zone sequence. However, as indicated by the dotted line along FIGURE 2A, shaft PS was not so engaged this cycle and thus cannot be so translated to punch. This constitutes an error condition to be detected from the fact that no flux from magnet PM will be projected at detect core 3 for quasi-switching thereof. The absence of such flux is indicated along FIGURE 2C, no "flux pulse" $fp$ occurring then. Consequently, when the following drive pulse ($d$–2—cf. FIGURE 2D) is applied to cores 3 and 5 by driver D (at "check-time," immediately following bail bottoming time), an error signal $e$–2 (see FIGURE 2E) will be generated at the input to SA. Driver D may, of course, be synchronized as known in the art, with the oscillation of the driving means (bail in FIGURE 2A) and will be assumed to have reset cores 3, 5 (pulse $d$–1) in the prior cycle, before occurrence of select pulse $b$–1. Amplifier SA will thus receive an error pulse $e$–2 because the resetting of cores 3, 5 failed to switch both from a like ("non-reset") state and generate "like" outputs therefrom; detect core 3 not having "seen" the flux from magnet PM for some reason (e.g. interposer coupling operation defective). That is, select core 5 would have been "set" by the select pulse from SPG while detect core 3 would remain in its original, reset state. Stated otherwise, when reset pulse $d$–2 is applied and tends to align the magnetic domains in cores 3, 5 in the reset state, a flipping or switching occurs with core 5 to produce an output of prescribed polarity therefrom, but no such switching of core 3 takes place and thus no opposite polarity (bucking) readout pulse is derived therefrom. Cores 3, 5 are left "reset" by readout pulse $d$–2 to begin the next cycle.

Figure 3:
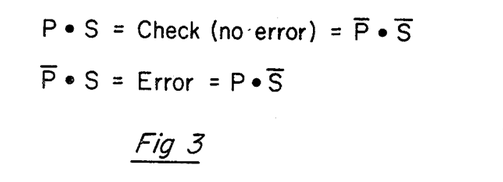
FIGURE 3 comprises a pair of logical expressions denoting the logical operation of the verification system in FIGURE 1.

In the next punch cycle, a second select pulse $b$–2 again switches ("sets") select core 5 and as indicated along FIGURE 2A, this time causes the interposer to couple shaft PS so as to begin a punch-actuation translation of PS and associated magnet PM. Magnet PM soon arrives operatively adjacent detect core 3 (when shaft PS assumes its extreme, bottoming position) and applies a "quasi-switching" flux $fp$ (2c) to core 3 which is switched to the "one-half" state. Thus, unlike the preceding error-sequence both cores 3, 5 have been switched out of the reset state when the following reset pulse $d$–3 is applied and they will both be switched to reset state, inducing equal, opposite (bucking) outputs at associated diodes D5, D3 and produce an effective null at amplifier SA, thus indicating "no error" (signal $e$–2, FIGURE 2E). The above will be understood by those skilled in the art to be a somewhat simplified description and illustration of the structure and operation of a punching system, many details thereof being omitted and simplified for purposes of emphasis and clarity. This operation is functionally indicated and summarized by the logical expressions in FIGURE 3, correlating the conditions of punching P, of not punching $\overline{P}$, of selecting S (i.e. commanding a prescribed punch) and not selecting $\overline{S}$.

Figure 6:
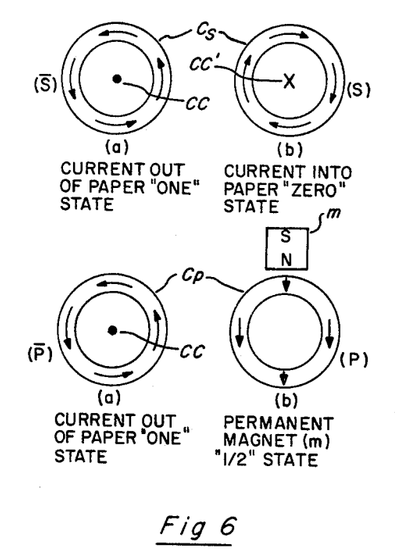
FIGURE 6 is an idealized schematic drawing illustrating various magnetic states believed to obtain in representative core storage devices like those indicated for the system in FIGURE 1.

FIGURE 6 is offered to aid in understanding the changes thought to be effected in the magnetic condition of the cores shown in FIGURES 1 and elsewhere as this is best understood, although it will be realized that this is only by way analogy and cannot be verified as actually representative, since the phenomenon is incompletely understood at present. Thus, it will appear that when a core $C_p$ is "quasi-switched" by magnetic flux from a closely adjacent permanent magnet, the flux applied thereto is somewhat different from that applied from current through a coil about a like core $C_s$, such as through select core 5 threaded by the select wire 11. Likewise, the resultant modulation of the magnetic states of the cores will be different as is schematically indicated by the arrows associated with exemplary select core $C_s$ shown before ($\overline{S}$) and after (S) setting by a wound conductor (CC) and a detect core $C_p$, similarly shown before ($\overline{P}$) and after (P) quasi-switching by a magnet $m$. The arrows may be understood to represent individual magnetic dipoles, or groups of magnet domains, their direction indicating the switched state thereof directionally.

Thus, referring to select core $C_s$ which has been "reset" into a prescribed "one" state (state $\overline{S}$) by the magnetic field induced by current through associated winding CC, the magnetic state thereof may be reversed by reversing the direction of winding current (as indicated at winding CC') to switch core $C_s$ into the "zero" state (state S). When this happens, it is believed the dipoles (arrows) switch 180°, i.e. completely flip. However, when a core, such as detect core $C_p$ is similarly assumed as reset into the "one" state (state $\overline{P}$) by a like winding (CC) and the domains thereof thereafter subjected to flux from a permanent magnet $m$, the magnetic dipoles will likely be rotated differently, probably less than 180° or "quasi-switched" condition, indicated as the "one-half" state (state P) of core $C_p$. It appears that the amplitude of the flux from magnet $m$ is significant in affecting core $C_p$, whereas the rate of current (flux) change in wire CC' is significant in affecting core $C_s$. In both cases, i.e. whether electric current or changing magnetic flux modulates the cores' magnetic state, it will be apparent that cores so affected may maintain this state, bistably, and be read out later, conjunctively when a "reset" signal is applied to switch them back to reset state.

Figure 5:
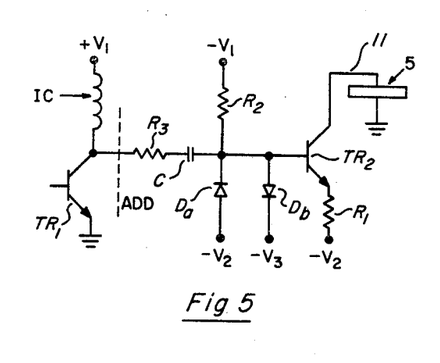
FIGURE 5 shows an electrical schematic of a representative select pulse applying circuit for employment with the system in FIGURE 1.

FIGURE 5 indicates a practical embodiment of an electronic current generator arrangement for "setting" a select core, such as core 5, in FIGURE 5. Using this circuit, the interposer (actuation command) pulses, along interposer coil IC through transistor switch TR1, may be advantageously employed to "set" select core 5, one such circuit being provided for each select-memory unit in each punch position according to the invention. Thus, the appearance of a "punch-select" pulse on the base of a select transistor TR1 will cause the switching thereof to conduct an interposer-actuating pulse to proceed through interposer coil IC, coupling the associated shaft PS for the punching translation. This pulse will cause a negative (opposite polarity) pulse to be coupled along a load resistor R3 and an isolating capacitor C to a resistive load R2. R2 is connected to a source of potential $-V1$ and also coupled through a clamp diode $D_a$ to $-V2$. A detecting transistor TR2 is coupled between the select winding for core 5 and potential $-V2$, its base coupled to $-V3$ through a diode $D_b$. The negative pulse will not affect TR2, but responsive thereto, a rise in potential will appear and decrease the forward bias across diode $D_a$ which responsively becomes conducting to present a negative pulse at the base of detecting transistor TR2. This will drive TR2 conducting so as to pass current from source $-V2$ through a load impedance R1 and thence, through the select core winding 11 to ground. The conduction of this pulse, however, quickly drives clamp diode $D_a$ into "cut-off" by causing associated cut-off diode $D_b$ to conduct.

While transistor TR1 is normally non-conducting, transistor TR2 is biased "normally-off," its emitter being set at $-V2$ volts, while its base is held at a slightly more negative voltage by the voltage drop across clamp diode $D_a$. Diode $D_a$ receives its current from the negative source $-V1$ through load resistor R2.

When the command pulse terminates, transistor TR1 cuts off, causing a positive pulse to be coupled to resistor R3, capacitor C and clamp diode $D_b$ to the $-V3$ source, this pulse being applied to the base of transistor TR2, thus rendering TR2 conductive to apply a constant "set-switching" current through select core 5. It will be understood that since the amplitude of the pulse applied to the base of TR2 is approximately $-V3$ volts, regardless of the amplitude of the pulse coupled through condenser C, that the emitter current of TR2 will be constant, this emitter current will assume a value determined by its base voltage $-V3$, its collector resistance R1 and its collector biasing potential $-V2$, that is, by the difference between voltages $-V3$ and $-V2$ divided by R1. With the emitter current thus kept constant and the amplification of TR2 being approximately "one" ($\Delta I_c/\Delta I_e$), the collector current will likewise remain constant and be independent of collector load (i.e. core impedance) variations. In summary, the select driver circuit of FIGURE 5 provides an advantageous means for using the punch command pulse to apply a constant current select pulse through core 5 to magnetize it to the prescribed "set" state.

Workers in the art will appreciate equivalent and different ways of doing this. For instance, in certain cases, the circuit of FIGURE 5 may be grossly simplified where circumstances permit, core 5 being coupled directly to transistor TR1 through an intervening capacitor and resistor, no other components being required and transistor TR1 being the only active component (TR2 being dispensed with). However, one might additionally provide a negative shunt diode, coupled between the said coupling resistor and ground, to shunt all substantial negative-going pulses through the coupling capacitor to ground and prevent them from affecting core 5. Further, an isolating diode may likewise be connected between core 5 and ground, being poled to provide a high resistance path for current flow in this direction. Thus, in this simplified case, when the command pulse renders TR1 conducting, a negative-going pulse will be coupled through the capacitor, but shunted to ground and prevented from flowing through winding 11 about core 5. When the interposer coil pulse terminates, a positive-going (kick-back) pulse will then be coupled through the capacitor and resistor to drive core 5 switchingly, being coupled to ground through the aforesaid isolating diode, which provides a low impedance path for such positive-going pulses. This shunting diode will be reverse-biased to provide a high impedance path to ground, while the coupling resistor will determine the value of the current through winding 11.

Workers in the art will recognize that the principles of the invention may be implemented in a number of different ways and for different applications beyond those of the described embodiment. For instance, use of the checking system as described for a punch-check also suggests the analogous use thereof as an "echo-check" system for monitoring print hammers in a high speed printer. It will also be apparent that equivalent means may be employed for the select core and the translation-detecting core, i.e. means which may be equivalently switched into a prescribed stable binary condition by the occurrance, respectively, of a translation command pulse and actuator translation. It will be understood for instance that the above-described cores may be replaced by related bistable switch means which are switchable by prescribed magnetic flux; such means as a bar of square-loop ferromagnetic material, a toggling magnetic read-switch arrangement or the like.

Likewise, equivalent select pulse generating means may be used to "set" the select memory means in place of generator SPG and similarly for detect pulse generating means in place of magnet PM. In some cases the select memory means may simply be switched by a permanent magnet similar to magnet PM being brought operatively adjacent thereto at "select pulse" times by an analogous moving carrier. In such a case both memory means will be used to conjunctively detect prescribed translations of two movable carriers, each having a flux-generating means thereon and would automatically indicate whether like or unlike translations occurred.

Additionally, more than two memory means and associated flux-generating switch means may be operated serially through the reliability of the system will decrease as these units are added since one will not be sure whether one or several units caused an error (or pairs of errors caused "no error" output). Of course, in any case, components may be saved and efficiency optimized by using (e.g. for all punch verification arrangements) common reset-readout drive means and by buffering all of the error outputs (such as from amplifier SA) to a common output line. Here, the existence of any one error signal will indicate occurrence of an error "somewhere" in that card column, at that time. This is often satisfactory for flagging punching errors in a card punch system. Also, the reset-readout means may be differently provided as long as it is properly timed; for instance, comprising a readout pulse from another related detect core, as with the arrangement of FIGURE 11. Further, where no "memory" is required for the detect means, the detecting-magnet flux may be employed to inhibit readout, as for FIGURE 8 using set winding I, or may be arranged to induce readout of itself (as FIGURE 11) as well as resetting, if practical.

Such checking systems according to the invention, may be provided for other like mechanical arrangements to monitor the operation of each translatable actuator therein, the error-indicating outputs therefrom being read separately or in combination. It will be apparent that such a verification system may be used to check the proper translation of a linearly-moving member (cf. FIGURE 10) rather than a reciprocably-moving member (like shafts PS in FIGURE 1). For instance, in a system for incrementally stepping a belt or tape record a prescribed distance at prescribed command times, magnetic (strobe) marks or the like may be laid down along equal stepping distances and sensed by means analogous to detect core CSW as a verification of the proper stepping response of the translating means, and thus verify the proper execution of stepping commands, the generation of which may be sensed by means analogous to select core 5 in FIGURE 1. Of course, the record must be stepped beyond a minimum distance sufficient to assure that the magnet has passed the core. One must also reset the cores at proper intervals. If the time interval between sensing of successive marks is sufficient to allow the detect core to be read out and reset, continuous operation may be possible also. Different, equivalent readout means may be used in place of amplifier SA for detecting the generation of a given combination of core readout pulses as an indication of error conditions.

While in accordance with the provisions of the patent law, the above has illustrated and described preferred forms of the invention and their mode of operation, it will be apparent to those skilled in the art that changes may be made in the apparatus described without departing from the spirit and scope of the invention that, in some cases, certain features of the invention may be used to advantage without a corresponding use of other features and certain features may be changed or substituted for, equivalently, as appreciated by those skilled in the art.

Having now described the invention and what is claimed as new and desired to be secured by Letters Patent is:

1. Data processing apparatus including a plurality of like actuator elements selectively responsive to predetermined command signals, each said actuator element being movable along an actuation direction through a check zone and being associated with a verification system comprising:

permanent magnet flux projecting means mounted on said actuator element to create a first magnetic field in said check zone only when said actuator element properly responds to said command signal, a bistable actuate-memory means assuming a set state in response to said first magnetic field and being switchable to a reset state by a reset magnetic field, said actuate-memory means comprising a ferrite core member having a facing portion disposed adjacent said check zone, the cross-sectional shape of said member being reduced adjacent said facing portion along the direction of actuation to intensify the flux therein and reduce the switching zone of said actuate-memory means, command signaling means to receive said command signals and produce a predetermined second magnet field in response thereto, a bistable command-memory means assuming a set state in response to said second magnetic field.

reset field producing means coupled to each of said memory means for switching thereof out of said respective states at readout times subsequent to occurrence of both said command signal and said responsive actuation of said actuator element, and readout means coupled to each said memory means, adapted to verify the switching of both said memory means, said readout means comprising an output terminal and a pair of output conductor means coupled to said memory means to present relatively equal, opposed polarity pulses from said respective memory means to said output terminal to identify the existence of like magnetic states in said memory means.

2. In a data processing apparatus including a plurality of like punch knives responsive to predetermined punch signals, each said punch knife being movable along a predetermined path through a check zone and being operatively associated with a punch check system comprising:

permanent magnet means mounted on said punch knife to create a first setting magnetic field in said check zone only when said punch knife properly responds to said punch signal, a first hollow ferrite core member defining a closed magnetic circuit, said core member being disposed adjacent said check zone and being switchable to a set state in response to said first setting magnetic field and switchable to a reset state in response to a resetting magnetic field, second magnetic means for providing a second setting magnetic field in response to said punch signals, a second hollow ferrite core member defining a closed magnetic circuit, said core member being disposed in flux receiving relationship with said second magnetic means, and being switchable to a set state in response to said second setting magnetic field and switchable to a reset state in response to a resetting magnetic field, means for selectively coupling a resetting magnetic field to each said core members to switch said respective core members to said reset state following a predetermined checking interval, and readout means coupled to each of said core members to check the operation of said punch knife, said readout means including an output terminal and a pair of winding means coupling said terminal to said core members to supply relatively equal pulses to said terminal upon reset switching of said core members, said winding means being adapted to present said pulses in opposing relationship at said terminal to indicate a punch operative condition by similarity in the magnetic states of said cores.

References Cited

UNITED STATES PATENTS

| | | | |
|---|---|---|---|
| 2,905,931 | 9/1959 | Lubkin | 340—174 |
| 3,133,271 | 5/1964 | Clemons | 340—174 |
| 3,366,876 | 1/1968 | Kurth et al. | 340—268 |
| 3,370,286 | 2/1968 | Buss | 340—259 |

BERNARD KONICK, Primary Examiner

G. M. HOFFMAN, Assistant Examiner

U.S. Cl. X.R.

235—61.7; 340—146.1, 149, 197, 259, 268